United States Patent [19]

Bailey et al.

[11] 3,747,079

[45] July 17, 1973

[54] REDUCING DEAD-TRACKING IN RECORDING SYSTEMS

[75] Inventors: David L. Bailey; Benjamin C. Fiorino, both of Longmont; Juan A. Rodriguez, Boulder, all of Colo.

[73] Assignee: International Business Machines Corporation, Armonk, N.Y.

[22] Filed: June 1, 1971

[21] Appl. No.: 149,066

Related U.S. Application Data

[63] Continuation of Ser. No. 887,150, Dec. 29, 1969, abandoned.

[52] U.S. Cl. .................... 340/174.1 B, 340/174.1 H

[51] Int. Cl. .............................................. G11b 5/02

[58] Field of Search .............. 340/174.1 A, 174.1 B, 340/174.1 H; 333/11

[56] References Cited

UNITED STATES PATENTS 3,074,027 1/1963 Rout ...................................... 331/2

3,518,625 6/1970 Agin ............................ 340/174.1 B

*Primary Examiner*—Vincent P. Canney

*Attorney*—Hanifin and Jancin and Herbert F. Somermeyer

[57] ABSTRACT

A self-clocking magnetic recording system, such as a magnetic tape system, is subject to dead tracking (i.e., loss of signals from a track on the media). During dead-tracking, the variable frequency clock VFC) associated with the dead track is synchronized to the data frequency of an adjacent operating track to thereby maintain the VFC of the dead track at approximately the desired frequency. This action enables resyncing the VFC to its track. Upon successful detection of data being read from a given dead track, synchronization of the given VFC is returned to the given track.

18 Claims, 3 Drawing Figures

REDUCING DEAD-TRACKING IN RECORDING SYSTEMS

This application is a continuation of application Ser. No. 887,150 filed Dec. 29, 1969 and now abandoned.

BACKGROUND OF THE INVENTION

The present invention relates to magnetic media recording systems and, more particularly, to automatic resynchronization of data signal synchronized clocks used in such recording systems.

In recording systems utilizing moving magnetic media, a technique called "dead tracking" is used to eliminate the introduction of false signals into a readback system. When the proper signal envelope no longer appears in a readback amplifier, the associated circuitry of the given track is inhibited from operation. Known error detection and correction techniques are then often used to insert the appropriate data in place of signals that should have been read from the track. Dead-tracking can have several causes. One is lift-off of the tape from the transducer over which it is moving. Another is a flaw in the magnetic media. Irrespective of the cause, dead-tracking, especially in high-density recording systems, has been and will probably continue to be a serious problem. The necessity for dead-tracking tends to reduce the data throughput of the recording system. For example, in magnetic tape recording systems, it has been the practice of many users to limit the length of a block of data in order to reduce dead track exposure. That is, in most magnetic tape systems, data signals are recorded in blocks; such blocks are preceded by bursts of synchronizing signals termed a preamble and are followed by a burst of synchronizing signals termed a postamble. Generally, resynchronization of a dead track back to an operating track is performed either on the preamble or postamble. If a track becomes dead within a block of data, it has been the practice to continue the dead-tracking throughout the block of data. Therefore, to minimize the exposure to dead-tracking, the length of such blocks were reduced.

This arrangement reduces the data throughput for several reasons. One is that between blocks of data signals, there is a space on the tape with no recording. Another is the resynchronization bursts require space on the magnetic media which otherwise could be used for recording data. Therefore, not only is the throughput reduced, but also the storage capacity of a tape is reduced. Further, data signals in a file are spaced further apart on the tape than they need be. This increased spacing has the effect of increasing random access time to a given set of data signals. Accordingly, it is desirable that dead-tracking be minimized and, preferably, dead-tracking should be correctible within a block of data. Such a facility in a magnetic recording system would greatly enhance its value to a user.

SUMMARY OF THE INVENTION

It is an object of the present invention to enable resynchronizing a dead track with a minimum adjustment of its variable frequency clock (VFC).

It is another object of the present invention to enable resynchronization of a dead track with the utilization of minimum resynchronization signals.

It is a feature of the invention in conjunction with the preceding two objects to maintain the VFC of a dead track at approximately the data rate frequency.

In accordance with the present invention, the VFC of a dead track is synchronized to the data rate frequency of another track in the system which is operable. Preferably, the other track is immediately adjacent the dead track such that skewing of the tape will have a minimum effect on varying the frequency of the desired dead track data rate frequency. In practicing the invention, there are various design choices of synchronization methods. For example, the VFC of a dead track may be synchronized by the output signal of the VFC of an operating track. Another is the synchronization of a dead track VFC with a frequency control signal, such as a voltage amplitude, used to operate the VFC of an operating track. Other techniques of synchronizing may also be used, such as using data signals read from another track.

The selection of the VFC source used to synchronize the VFC of a dead track may be made in accordance with the operating characteristics of the recording system. That is, one of a plurality of other VFC's is selected in accordance with the present operation of the recording system. A VFC associated with a certain operating track may simultaneously synchronize VFC's of two dead tracks. Other combinations of intertrack synchronization are possible.

The foregoing and other objects, features and advantages of the invention will be apparent from the following more particular description of a preferred embodiment of the invention, as illustrated in the accompanying drawings.

DETAILED DESCRIPTION OF THE ILLUSTRATIVE EMBODIMENT

Figure 1:
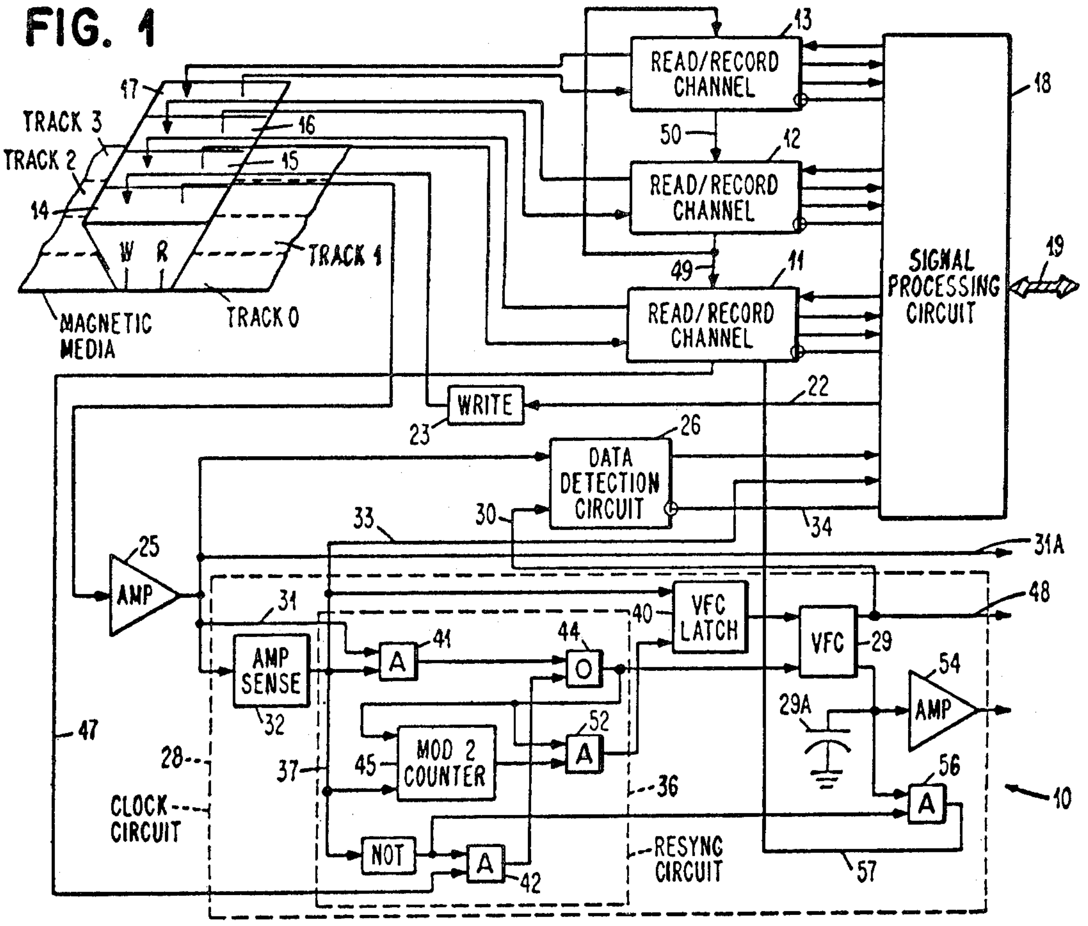
FIG. 1 is a simplified block diagram of a multi-track recording system used to illustrate the present invention.

FIG. 1 is a simplified illustration of a four-track magnetic tape recording system. This system includes four identical read/record channels 10–13 respectively associated with magnetic transducers 14–17. Each transducer is magnetically coupled to one of the tracks 0–3 on a magnetic media. Transducers 14–17 may be constructed in a single parallel track transducer, such as the type presently used in magnetic tape recording systems. Each transducer has a separate write gap W and read gap R, although a single gap may be used in practicing the present invention. Channels 10–13 are connected to signal processing circuit 18 which, in turn, is connected via cable 19 to other devices, such as a computer. Signal processing circuit 18 is generally called a tape adapter unit, control unit, synchronizer, or the like. Such circuits are well known for operating read/record channels 10–13 as well as controlling motion of magnetic media.

Since channels 10–13 are all identical, only channel 10 is shown in detail. The channel 10 illustration is simplified for more clearly pointing up the invention; it being understood that a practical implementation of a recording channel can be quite complex.

To record signals through transducer 14, signal processing circuit 18 supplies data signals over line 22 to write circuits 23. It is understood that write circuits 23 may be synced NRZI, phase encoding circuits or any suitable means of recording on a recording medium, magnetic, electrostatic, or otherwise. Write circuits 23 supply its recording signals to transducer 14.

Signals on the recording media are sensed by transducer 14 via gap R and supplied for amplification to amplifier 25. The amplified signals are supplied to data detection circuits 26 (of known design) for conversion from readback form to digital form usable by signal processing circuit 18. Data detection circuits 26 are designed to detect the type of recorded signals employed in the system.

In addition to the just-described data circuits, channel 10 has clock circuits 28 used in the detection of signals from transducer 14. Such clock circuits include variable frequency clock (VFC) 29 which supplies clock signals over line 30 used as a reference for the digital signals being processed through circuits 26. Such clock signals define the recording cells of the recorded signals, as is well known. In a self-clocking system VFC 29 is synchronized by the readback signal on line 31 supplied by amplifier 25. VFC 29 may consist of a phase lock loop of known design. Alternately, it may be a VCO, or a very high frequency oscillator which has its output signals divided by a logic network with the logic connections of such network being altered in accordance with the phase and frequency of the readback signals. In any event, VFC 29 is synchronized to the signals being supplied from amplifier 25.

Additionally, amplitude sensing circuit 32 senses the presence or absence of a suitable read-back envelope of signals. Usually minimum amplitude threshold is required for successful signal detection. This detection is useful in detecting the presence of a block of data signals, the inter-block gaps, and a dead track. For example, if channels 11–13 are successfully processing data signals while amplitude sensing circuit 32 of channel 10 indicates insufficient signal amplitude, channel 10 should be dead tracked (i.e., its operation is inhibited). The lack of a channel 10 readback signal is indicated by a control signal supplied over line 33 to signal processing circuit 18. If the other channels 11–13 are supplying signals, a control signal is supplied over line 34 to inhibit operation of detection circuits 26. In an actual constructed embodiment, there may be a complex control circuit associated with amplitude sensing circuit 32. Such control circuit is not described here because it is well known and would only serve to occlude an understanding of the invention. The synchronization of VFC 29 in a data channel of a magnetic recording system utilizing the preamble and postamble burst of signals is well known and will not be described. The present description assumes that there was a successful initial synchronization of VFC 29 to signals on line 31.

In accordance with the teachings of the present invention, to reduce dead-tracking, clock circuit 28 has circuits for controlling VFC 29 in a new and different manner. The illustrated control circuitry added to clock circuit 28 in accordance with the present invention is shown in simplified form. In a constructed embodiment, it may be necessary for reasons of design choices to add complexity to such additional circuits. Also, a microprogram in a programmable control circuit may be used in practicing this invention.

The illustrated additional circuits include VFC latch 40, plus AND circuits 41 and 42 for selectively gating data signals either from amplifier 25 or signals from another source to synchronize VFC 29. The latter are used during the dead-tracking operation of channel 10. Resync circuit 36 switches VFC 29 between local to remote reference in a manner to reduce undesired transients operation as will become apparent.

During normal operations, amplifier 25 supplies suitable signals to circuit 26, amplitude sensor 32 and to VFC 29. Sensor 32 is responsive to such signal to supply an activating signal to AND circuit 41. AND circuit 41 is responsive to this activating signal to pass amplifier 25 supplied signal on line 31 to synchronize VFC 29 to the readback signal frequency. VFC 29 frequency tracks the data frequency to define the bit periods of the readback signal as is well known. During normal operations, VFC latch 40 is set (as will be later described) enabling VFC 29 to operate in response to the readback signals received from AND circuit 41 via OR circuit 44.

Whenever channel 10 is being dead-tracked, there may be no signals or there may be spurious signals being supplied over line 31 to VFC 29. Therefore VFC 29 could drift in frequency or could be forced to some frequency by the spurious signals until its operating frequency is substantially different from the data rate frequency of the signals to be later supplied through amplifier 25. Also, tape velocity can vary which varies the frequency of the readback signal. If successful, signal recovery is re-established because the tape is returned to the transducer, for example; then, the resynchronization of VFC 29 to the actual data rate frequency may require a substantial change in frequency. The frequency difference may be sufficiently large that the resynchronization is impossible without a complete reinitialization of the tape system. Accordingly, it may take a large number of synchronizing signals, such as that found in the preamble or postamble to successfully synchronize VFC 29 to the actual data rate frequency. This is one reason that, to date, VFC's are not resynchronized within a block of data signals; rather the recording system must wait until a postamble or preamble is encountered.

The present invention enhances the possibility of resynchronizing VFC 29 within a data block of signals by synchronizing VFC 29 during dead-tracking operations with VFC signals from another data channel which has the approximate data rate frequency of the channel being dead-tracked. Preferably, such synchronization should be from an adjacent track.

Figure 1A:
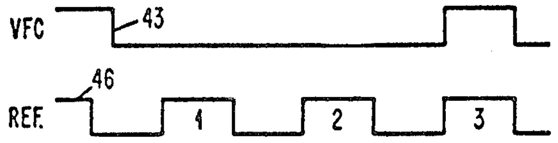
FIG. 1A shows a set of waveforms illustrating syncing a VFC.

As soon as amplitude sensor 32 detects the lack of signal from transducer 14, it changes its output signal on line 37 from an activating to a deactivating signal. This deactivating signal is supplied to signal processing circuit 18 which, in turn, supplies a signal over line 34 to inhibit operation of data detection circuits 26. The change in signal state sets VFC latch 40 to its inactive condition, thereby stopping VFC 29 from producing any signals. In FIG. 1A, this corresponds to point 43 on the VFC signal. Simultaneously AND circuit 41 is disabled, thereby blocking line 31 signals from reaching VFC 29. It is understood that VFC 29 has a memory element, such as capacitor 29A, for storing an analog signal which detemines frequency of operation. VFC 29 is disabled only a short time such that the stored analog signal amplitude is maintained.

To insure that the VFC will frequency lock into the reference signal, it is necessary that the phase of VFC 29 be the same as the reference frequency. In this regard, VFC 29 is held off for two cycles of oscillation corresponding to the positive excursions 1 and 2 in reference signal 46. This short delay does not materially affect the stored control signal. The delay desired for phase synchronous switching is provided by modulus 2 counter 45 (a ring counter, for example). The counter is activated (a "1" is placed in the ring counter to be shifted two steps) by the change in the amplitude sensor 32 output signal. Simultaneously AND circuit 42 is enabled to pass line 47 reference signal 46 from channel 11. These signals are supplied through OR circuit 44 to VFC 29 and to step counter 45. Counter 45, after two steps, enables AND circuit 52 to pass the next positive transition of reference signal 46 to set VFC latch 40. Latch 40 being set enables VFC 29 to generate clock signals in phase with reference signal 46. Since VFC 29 was operating at a frequency relatively close to reference signal 46 frequency, transients from reference signal switching are minimized.

Switching from a local reference back to a restored track follows the same procedure. Sensor 32 switches its output signal from deactivating to activating state which resets VFC latch 40 to stop VFC 29, activates counter 45 and supplies an activating signal to signal processing circuit 18. AND circuit 42 is disabled while AND circuit 41 is enabled. OR circuit 44 is now supplying a restored data signal from amplifier 25 to VFC 29. As before, VFC 29 remains off until latch 40 is again set.

Activating and deactivating VFC by latch 40 is well known; for example, keyed oscillators and the like.

So long as channel 10 is dead-tracked, VFC 29 is synchronized in accordance with the data rate frequency of channel 11. The magnetic record tracks associated with channels 10 and 11 are side-by-side on magnetic media. Therefore, irrespective of skewing of the magnetic media with respect to a transducer containing transducers 14–17, the data rate frequency of channel 11 should always remain approximately that of the desired data rate frequency of channel 10. Accordingly, during channel 10 dead-tracking, VFC 29 is maintained at an operating frequency approximately that of the data rate frequency of signals upon the reestablishment of successful operation of channel 10. Such approximation of the operating frequency enables the resynchronization time of VFC 29 to the data signals later supplied through amplifier 25. Alternately, the VFC synchronizing signals on line 47 could be obtained from channels 12 or 13.

VFC 29 may also be used as a source of synchronizing signals. Its output signals are supplied not only over line 30 to data detection circuit 26 but also over line 48 for connection to an external circuit, such as another data channel (not shown). The channels 11–13 are constructed as channel 10; their VFC output signals are supplied respectively over lines 47, 49, and 50. Also, the signals on line 31 can be supplied as a reference signal as indicated by arrow 31A. A third source of reference signal is capacitor 29A. High input impedance unity follower amplifier 54 is usable to supply the stored analog value to another VFC. In the latter case, AND circuit 56 selectively transfers the analog signal on line 57 from channel 11 to capacitor 29A. No phasing is required in this latter arrangement. When disabled, AND circuit 56 presents high impedance to capacitor 29A.

As shown in FIG. 1, when channel 11 is being dead-tracked, its VFC is synchronized by the VFC signal supplied over line 49 from channel 12. If channel 12 is being dead-tracked, its VFC is synchronized by the VFC signal supplied over line 50 from channel 13. However, when channel 13 is dead-tracked, its most adjacent data channel is channel 12, and it receives VFC synchronizing signals over line 49. Therefore, the VFC of channel 12 selectively synchronizes VFC's in both channels 11 and 13. It is understood that the means used to select the VFC synchronizing signals from either the data signals being supplied to a channel or from another source may be made as simple or as complex as desired. For example, the synchronizing signals for VFC 29 not only could be selected to be supplied over line 47, but further decision circuits may be utilized to select from either channel 12 or 13. Alternatively, the frequencies of all three channels 11–13 may be averaged and that used as a synchronizing signal. That is, all of the operating channels could supply their respective VFC signals to a frequency averaging circuit for establishing a VFC synchronizing signal usable by any dead-tracked channel.

Figure 2:
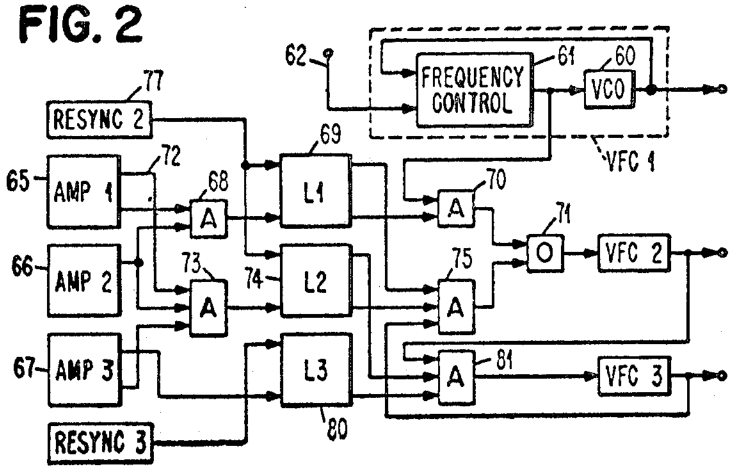
FIG. 2 is a simplified logic flow diagram illustrating several arrangements usable for practicing the present invention.

To illustrate some of the choices in the selection of VFC synchronizing signals during dead-tracking operations, a logic switching system is discussed. In FIG. 2, the circuit is designed to be utilized with a three channel recording system, wherein channel 1 has VFC 1, channel 2 has VFC 2, and channel 3 has VFC 3. VFC 1 consists of voltage controlled oscillator (VCO) 60 having its output supplied to frequency control 61. Herein, the output frequency is compared with a reference signal supplied over line 62 which may correspond to line 31 of FIG. 1. The output signal of VCO 60 is also supplied to data detection circuits of channel 1 (not shown). Three amplitude sensors 65, 66, and 67, respectively, for channels 1, 2, and 3, correspond to amplitude sensing circuit 32 of FIG. 1. FIG. 2 does not illustrate the resync circuit 36 of FIG. 1; however, it is to be understood such resync circuit should be used with each of the VFC's. Assume, for purposes of discussion, that amplitude sensor 66 (channel 2) during a read operation has detected absence of a readback signal envelope and, therefore, channel 2 (not shown) is being dead-tracked. It is desired, therefore, to synchronize VFC 2 to either the VFC 1 or VFC 3. In accordance with some predetermined characteristics, it is desired to synchronize VFC 2 to VFC 1. If channel 1 is not operative (i.e., being dead-tracked), VFC 3 is then the synchronizing source. AND circuit 68 is jointly responsive to amplitude sensor 65 being high (i.e., channel 1 is operative), and amplitude sensor 66 being low to supply a latch setting signal to latch 69. Latch 69 being set actuates AND circuit 70 to pass synchronizing signal from VFC 1 through OR circuit 71 to VFC 2. This effects synchronization of VFC 2 to VFC 1 during dead-tracking of channel 2.

If, however, VFC 1 is not operative because channel 1 is being dead-tracked, amplitude sensor 65 does not supply its enabling signal to AND circuit 68. This prevents VFC 2 from being connected to VFC 1. Amplitude sensor 65 when low supplies an enabling signal over line 72 to AND circuit 73. To enable VFC 2 to be synchronized by VFC 3, AND circuit 73 is jointly responsive to the line 72 signal; the low indicating signal from amplitude sensor 66 and a signal from amplitude sensor 67 indicating channel 3 is operative to set latch 74 to the active condition. Latch 74 being set enables AND circuit 75 to pass signals from VFC 3 through OR circuit 71 to synchronize VFC 2. As soon as channel 2 is resynchronized, as indicated by resync 2 circuit 77, latches 69 and 74 are both reset, thereby enabling VFC 2 to be again synchronized by data signals supplied from its own readback circuitry.

Another arrangement is to cascade the synchronization of VFC's of the various channels. For example, if both channels 2 and 3 are dead-tracked, it is possible to have VFC 1 synchronize both VFC 2 and 3. First VFC 3 is synchronized by VFC 2 even though VFC 2 is deadtracked. In this regard, latch 80 is set to the active condition by amplitude sensing circuit 67. Latch circuit 80 supplies an enabling signal to AND circuit 81. AND circuit 81 is jointly responsive to latch 80 being set, and latch 74 associated with channel 2 resynchronization as just described being reset to pass signals from VFC 2 to VFC 3 for synchronizing same. Latch 74 input to AND circuit 81 prevents cross-coupling of VFC 2 and VFC 3 when both channels 2 and 3 are being dead-tracked. At the same time, as described above, VFC 2 may be receiving synchronizing signals from VFC 1 through AND circuit 70. Therefore, both VFC 2 and VFC 3 are simultaneously being synchronized during dead-tracking operations by VFC 1.

From the above discussion, it should be apparent that there are many combinations of synchronization possibilities within the spirit of the present invention.

While the invention has been particularly shown and described with reference to a preferred embodiment thereof, it will be understood by those skilled in the art that various changes in form and details may be made therein without departing from the spirit and scope of the invention.

What is claimed is:

1. A parallel track magnetic recording system having a signal detection circuit for each of a plurality of tracks with read means for supplying a readback signal, each circuit having variable frequency clock (VFC) means responsive to signals derived from the associated track for generating clock signals having a predetermined relation to the data rate thereof, the system being subjectable to malfunctions during which no reliable signal is producible by at least one of said circuits, said tracks being spaced apart along a recording media;

the improvement including frequency synchronizing means comprising:

first means for sensing and indicating that a given circuit operatively associated with a given track is producing no reliable signals, while another circuit is generating clock signals derived from its associated track; and second means responsive to said indication for deriving a signal from said another circuit for synchronizing said VFC means of said given circuit to said derived signal while said given circuit is not generating a reliable signal from said given track.

2. The system of claim 1 having at least three tracks and each said signal detection circuit having an independent one of said first means, and said second means includes plural independent means operatively associated with pairs of said circuits respectively associated with adjacent ones of said tracks for exchanging signals between circuits in said pairs of respectively derived said VFC means.

3. The system of claim 1 wherein said second means includes plural independent means respectively associated with a plurality of adjacent tracks with said VFC means of said given track being operatively associated with at least two of said independent means such that VFC means in any of said adjacent tracks can be synchronized by signals derived from said VFC means of said given track.

4. The system of claim 1 wherein each said second means includes switching means, each said switching means receiving control signals from its respective operatively associated track and being supplied derived signals from a VFC means in a circuit operatively associated with another track, each said switching means capable of transferring said derived signals to said VFC means in its respective circuit and being responsive to said indication from said first means that said given circuit is the circuit operatively associated therewith to transfer one of said derived signals to said VFC means of said given circuit.

5. The system of claim 4, further including resync means in each of said circuits, said resync means being responsive to signals received from said given track to switch synchronization of said VFC means of said given track from signals derived from said another VFC means to signals from said given track.

6. The system of claim 1 including phase synchronizing means interposed between said VFC means in said given circuit and said another channel and said given circuit read means.

7. The system of claim 1 wherein said another channel VFC means supplies its clock signals to said given VFC means.

8. The system of claim 1 wherein said another channel VFC means has a stored signal and is operative to supply said stored signal to said given VFC means.

9. The system of claim 1 wherein said another channel VFC means includes amplifier means for supplying an analog signal representative of the frequency of operation thereof for use as a reference signal and said given VFC means includes means for receiving said analog signal.

10. The method of reducing duration of dead-tracking in a recording system, including the steps of:

detecting that a given channel is inoperative to supply readback signals and inhibiting operation of data circuits operatively associated therewith for dead-tracking said given channel;

synchronizing a given variable frequency clock (VFC) in said given channel with a signal derived from another VFC of a data circuit which is not so inhibited; and eliminating said dead-tracking by detecting successful readback operation of said given channel and then resynchronizing said given VFC with readback signals of said given channel.

11. The method of claim 10 wherein said another VFC means is selected always to be a VFC means associated with a track in the immediate geographic proximity on a magnetic media with said given track.

12. The method of claim 11 wherein said another VFC can be one of several VFC's of several channels and is selected in accordance with predetermined criteria established for the recording system.

13. A parallel track magnetic recording system having a signal detection channel for each of a plurality of active tracks with read means for supplying a readback signal, each channel having variable frequency clock (VFC) means responsive to signals derived from the associated track for generating clock signals having a predetermined relation to the data rate thereof, the system being subjectable to malfunctions during which no reliable signal is producible by at least one of said circuits, said tracks being spaced apart along a recording media;

the improvement including frequency synchronizing means, in combination:

first means for sensing and firstly indicating that a given channel operatively associated with a given track is not producing reliable readback signals; and second means responsive to said indication for supplying a frequency synchronizing signal related to said data rate for frequency synchronizing said VFC means of said given circuit to an approximate frequency of any readback signal from said recording means.

14. The system set forth in claim 13 further including means in said first means secondly indicating a reliable readback signal in said given channel and phase resynchronizing means responsive to said first means second indication to rephase said VFC means.

15. The system set forth in claim 14 wherein said second means receives a signal from another channel to supply said frequency synchronizing signal to said VFC means of said given circuit.

16. The system set forth in claim 13 wherein said second means includes means deriving a signal independent of said given circuit and related to the data rate in said system while said first indication is actively indicating dead tracking in said given circuit.

17. The system set forth in claim 13 wherein said second means includes switching means connected to a channel associated with an active record track with additional record tracks between said given and active record tracks and being responsive to said first indication to supply a signal to said given circuit derived from signals detected from said active record track.

18. The method of reducing dead tracking in a recording system, including the steps of:

detecting low-quality readback in a record channel, then, while the readback has a low-quality, inhibiting transfer of data signals therefrom while simultaneously frequency synchronizing said record channel to a data rate of the recording system based upon signals derived from the system independent of said record channel; and detecting possible recovery of said record channel from said low-quality readback, then rephasing said record channel to said readback signal for reestablishing readback operations.

* * * * *